United States Patent
Laudato, Jr.

[15] 3,691,573
[45] Sept. 19, 1972

[54] SELF-POWERED SIGNAL BUOY

[72] Inventor: Gaetano J. Laudato, Jr., 2 Lamartine Place, Jamaica Plain, Mass. 02130

[22] Filed: July 20, 1970

[21] Appl. No.: 56,348

[52] U.S. Cl. ................................................9/8.3 E
[51] Int. Cl. ................................................B63b 51/00
[58] Field of Search......9/8, 8, 3 E; 115/4, 5; 185/29, 185/30

[56] References Cited

UNITED STATES PATENTS

| | | | |
|---|---|---|---|
| 1,947,018 | 2/1934 | Plastino | 185/30 X |
| 1,177,499 | 3/1916 | Doane | 9/8 |
| 3,527,188 | 9/1970 | Shepard et al. | 115/4 |

*Primary Examiner*—Milton Buchler
*Assistant Examiner*—Gregory W. O'Connor
*Attorney*—Morse, Altman & Oates

[57] ABSTRACT

A signal buoy is provided with one or more pendulums operating an air compression system in which the pendulums swing with the motion of the buoy. Compressed air is stored in a charging tank until it reaches a preset pressure at which point it is released to drive an air turbine which in turn operates an electrical generator and through a voltage regulator charges batteries on the buoy. The battery, in turn, operates a signal lamp or other accessory equipment.

6 Claims, 3 Drawing Figures

SELF-POWERED SIGNAL BUOY

BACKGROUND OF THE INVENTION

1. Field of the Invention

This invention relates generally to signal buoys and more particularly is directed towards a self-powered signal buoy wherein the motion of the buoy by the wind and waves is utilized to maintain electrical power for accessory electrical equipment on board the buoy.

2. Description of the Prior Art

A conventional navigational sea buoy is provided with certain accessory equipment such as flashing lights, whistles or the like which serve to signal and guide vessels at sea. Such buoys customarily are anchored in position and are equipped with batteries to operate the electrical equipment on board. As would be expected, the batteries must be charged or replaced from time to time and this operation usually requires bringing the entire buoy ashore for servicing.

Conventional buoys thus are relatively expensive to maintain since they require rather frequent servicing of the batteries in order to maintain sufficient electrical power to operate the electrical equipment on board.

Accordingly, it is an object of the present invention to provide a self-powered buoy adapted to maintain electrical power on an indefinite basis. A further object of this invention is to provide an electrical generating system for use on a sea buoy or the like whereby the motion of the buoy by the wind and waves is converted into electrical energy.

SUMMARY OF THE INVENTION

This invention features a self-powered signal buoy comprising a buoy hull adapted to float on the water, at least one pendulum mounted to the buoy above the surface of the water in position to swing as the buoy moves with the wind and waves. An air compressor is drivingly connected to the pendulum whereby air is compressed as the pendulum moves and delivered to a charging tank. At a preset pressure, the compressed air is released to a turbo generator by which electrical power is generated and stored in a battery for use as required by the electrical systems on board.

DETAILED DESCRIPTION OF THE PREFERRED EMBODIMENT

Figure 1:
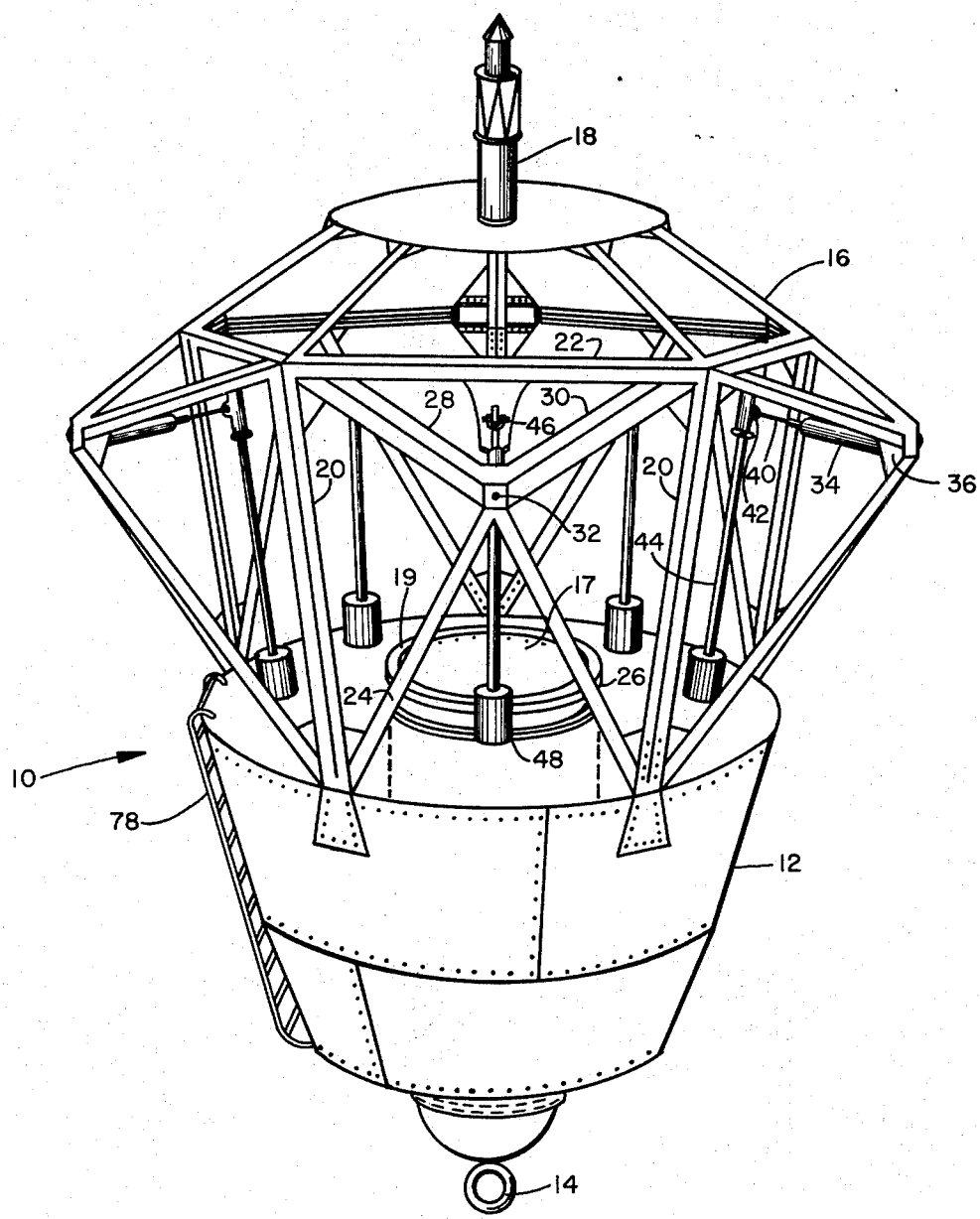
FIG. 1 is a view in perspective of a self-powered signal buoy made according to the invention.
Figure 2:
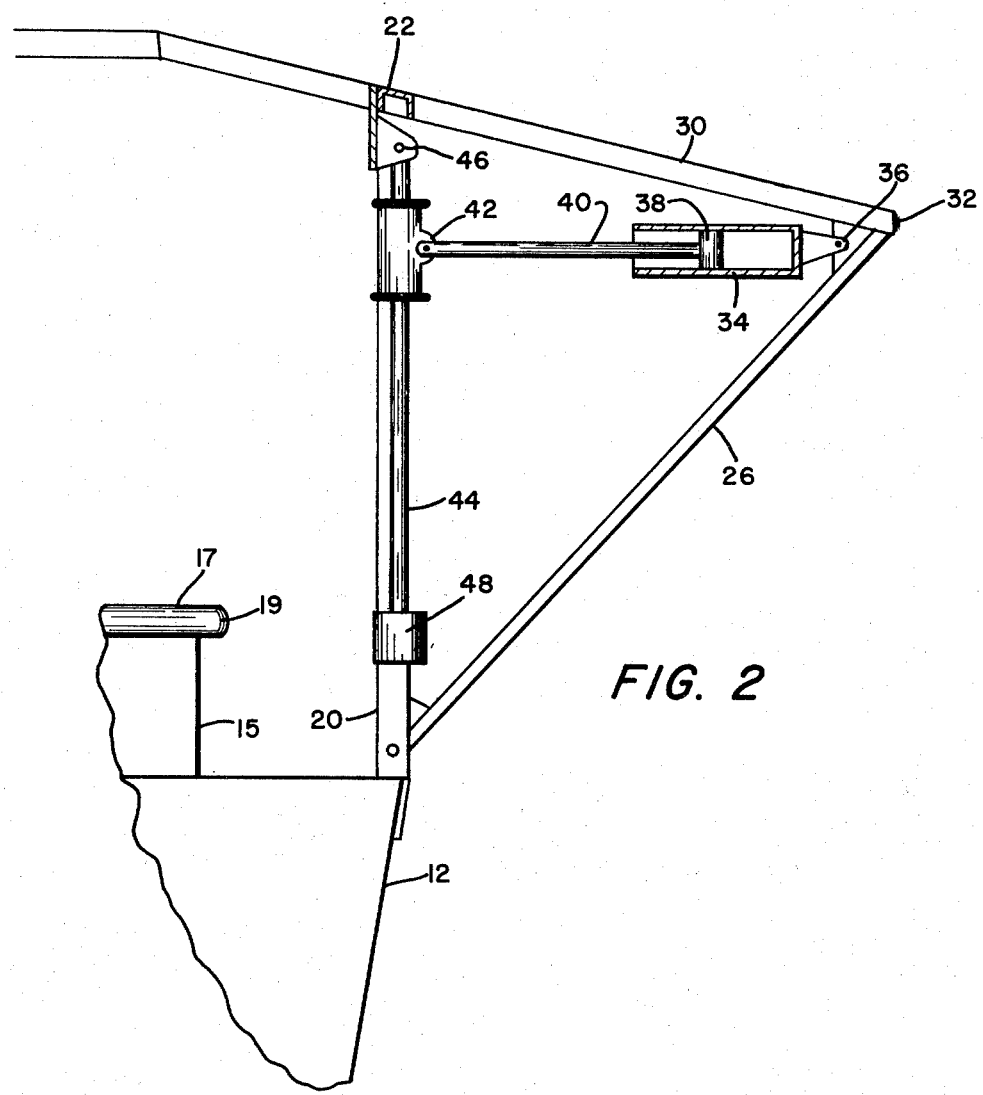
FIG. 2 is a fragmentary sectional view in side elevation showing details of the pendulum and compressor assembly, and, FIG. 3 is a schematic diagram of the system.
Figure 3:
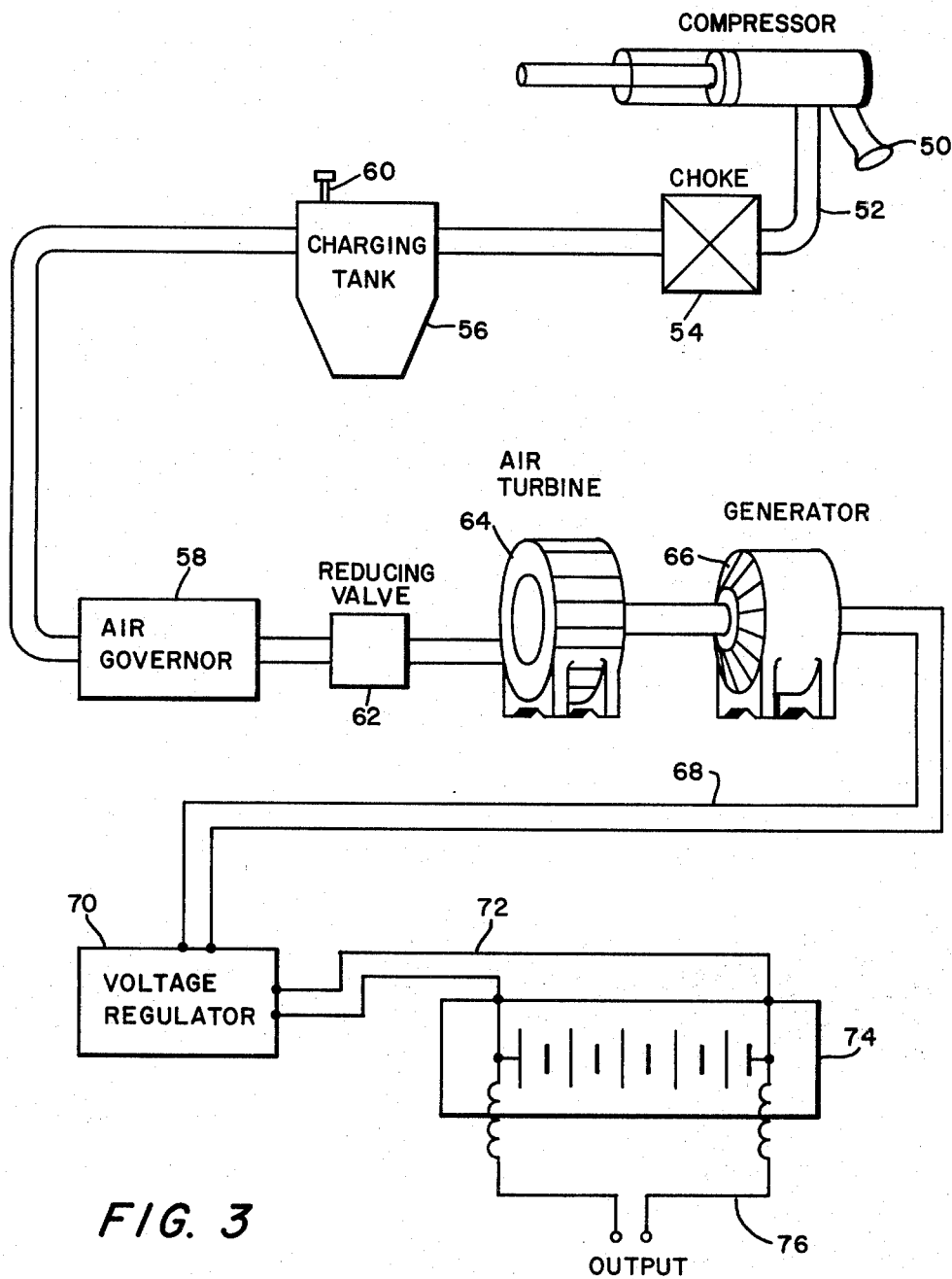

Referring now to the drawings and to FIG. 1 in particular, there is illustrated a signal buoy 10 generally organized about a water-proof hull 12 which in the illustrated embodiment is of frusto-conical configuration provided with an eye 14 at its base by which the buoy may be secured to its moorings. A coaming 15 is formed in the top center of the hull and is provided with an access hatch 17 and a surrounding resilient annular bumper 19.

Extending upwardly from the hull 12 is a frame word or superstructure 16 at the top of which is a signalling unit 18 such as a flashing beacon, whistle, siren or the like. The signalling unit is electrically operated and is connected by wiring to the electrical system enclosed within the hull 12 and to be described below. The unit may include several different signalling devices and also may include ratio transmission antennae, electronic repeater equipment, electronic navigational equipment such as Loran or the like.

The superstructure 16 includes spaced upright frame members 20, transverse members 22, intersecting lower support members 24 and 26, and upper intersecting support members 28 and 30 between each pair of upright members 20. The support members 24, 26, 28 and 30 are joined in a common apex junction 31 at which is mounted the outer end of an air cylinder 34 as by means of a hinge 36. The cylinder 34 is provided with a piston 38 having a rod 40 connected as by a hinge 42 to a pendulum 44. The pendulum 44 is suspended by means of a hinge 46 from the center of each cross piece 22 and preferably carries a weight 48 at its lower end. The pendulum is positioned so that it may swing radially to and away from a vertical center line of the buoy and in the preferred embodiment a number of pendulums, typically five or six, are arrayed in evenly spaced relation about the superstructure, each suspended from cross piece 22 to swing radially. The pendulums are disposed substantially about the periphery of the structure so that there is sufficient clearance to swing in board and the configuration of the supports 24 and 26 provide outboard clearance for the pendulum while supporting the cylinder 34. Inward motion of the pendulums is limited by the resilient bumper 19 which limits the stroke of the pistons and prevents interference amongst the several pendulums. By providing a plurality of pendulums about the buoy in the manner illustrated, at least one of the pendulums will swing regardless of the motion of the buoy. For example, if the waves and wind are coming from one direction at least of the pendulums will be in line with the motion of the buoy and will swing freely to operate the air cylinder 34.

As each pendulum 44 swings back and forth with the motion of the buoy, it will cause its associated piston 38 to reciprocate in its cylinder 34, thereby compressing air drawn through an intake 50 provided with a suitable check valve. The compressed air is then delivered to a discharge conduit 52 where it passes through a choke valve 54 before entering a charging tank 56. The tank 56 may be a compartment forming part of the hull 12 or may be a separate tank installed within the hull as desired. In any event, the tank 56 serves to store compressed air until it reaches a predetermined pressure under the control of an air governor 58. In the event of a malfunction of the governor 58 a pressure relief valve 60 is provided on the tank 56 to prevent rupture from excess pressure. In normal operations, when the pressure in the tank 56 reaches the present pressure controlled by the governor 58, the compressed air is released and passes through a reducing valve 62 to drive an air turbine 64. The turbine 64 drives an electrical generator 66 connected by leads 68 to a voltage regulator 70 which, in turn, is connected by leads 72 to a battery 74. The voltage regulator prevents overcharging the battery which is provided with leads 76 to the electrical equipment on board.

The battery has sufficient capacity to maintain a charge to operate the electrical equipment for extended periods in the event of an unusually long calm spell, although in practice there is usually sufficient sea motion to more than maintain a charge on the battery through the air charging system. The system is such that servicing of the buoy is greatly reduced insofar as the battery will be kept charged so long as the equipment functions properly and there is at least a minimum periodic movement of the buoy. Certain variations may be made in the system such, for example, employing a bellows in place of the piston and cylinder illustrated in order to compress air.

The buoy may also serve as a rescue station for sailors, swimmers, or others who may happen to be in distress in the vicinity of the buoy. For this purpose the buoy may be equipped with a ladder 78 or other handhold by which a person can climb aboard. The buoy may be formed with a compartment accessible through the hatch where an individual may await rescue. Food and fresh water may be stored in the buoy and and automatic emergency radio transmitter may be actuated by a person climbing the ladder or opening the hatch to signal the Coast Guard.

Having thus described the invention, what I claim and desire to obtain by Letters Patent of the United States is:

1. A self-powered signal buoy or the like, comprising
   a. a hull adapted to float on water,
   b. raised superstructure mounted on top of said hull and organized about a vertical centerline,
   c. a plurality of pendulums suspended for swinging movement from said superstructure through angularly spaced planes radial to said centerline,
   d. individual compression means operatively connected between each of said pendulums and said superstructure,
   e. air driven electrical generating means connected to all of said compression means, and,
   f. electrical power storage means operatively connected to said generating means,
   g. said air compression means including a piston and cylinder assembly slidably connected at one end to said pendulum and pivotally connected at the other end to said superstructure.

2. A self-powered signal buoy according to claim 1 wherein said air compression means includes a pressure tank for storing compressed air and a governor for releasing compressed air at a predetermined pressure to said generating means.

3. A self-powered signal buoy according to claim 1 wherein said generating means includes an air turbine and an electrical generator drivingly connected thereto.

4. A self-powered signal buoy according to claim 1 including a voltage regulator between said generating means and said storage means.

5. A self-powered signal buoy according to claim 1 wherein said storage means is a battery.

6. A self-powered signal buoy according to claim 1 wherein said pendulums are angularly spaced about said superstructure and mounted to swing inboard and outboard of said superstructure from different angular positions, and stop means mounted to said hull for limiting the inboard swinging motion of said pendulums.

* * * * *